Oct. 14, 1924.  
W. CRAMER  
BELT FASTENING DEVICE  
Filed Sept. 11, 1922  
1,511,710  
2 Sheets-Sheet 1
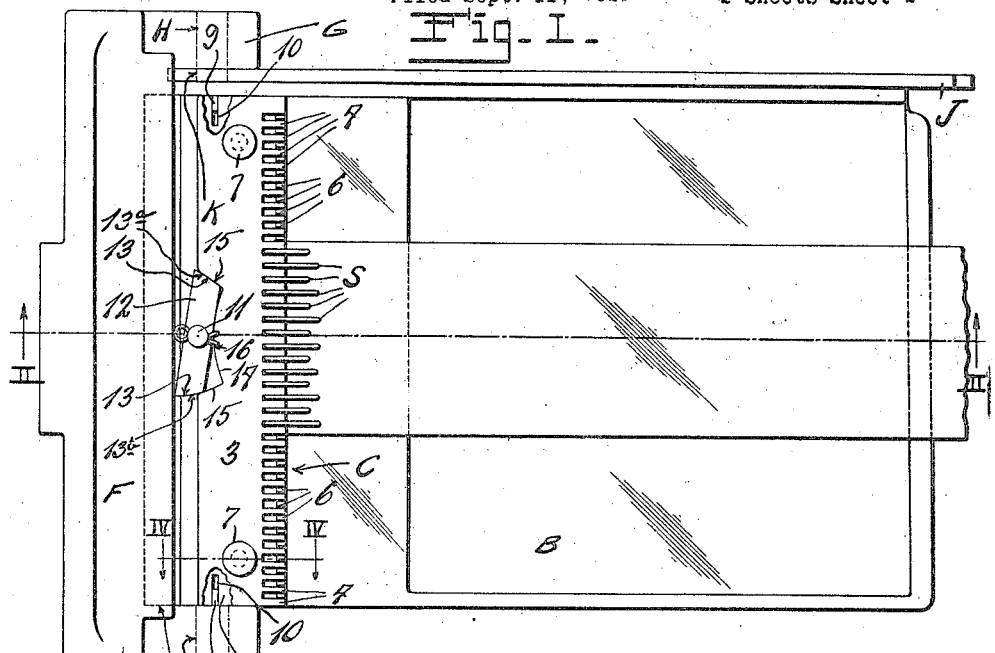
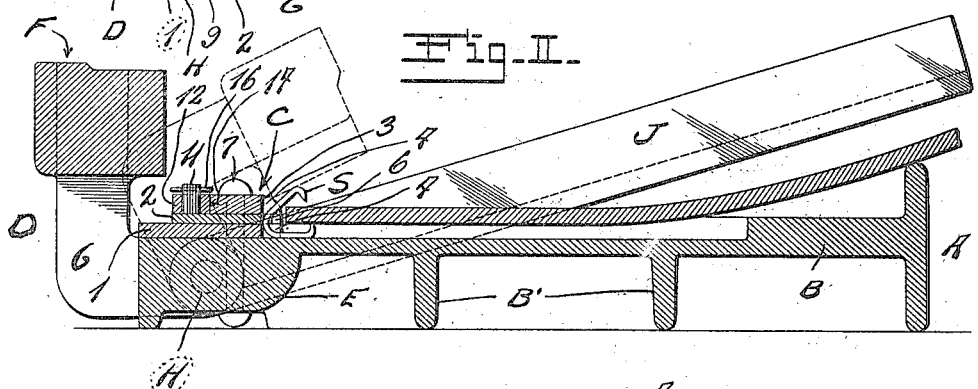
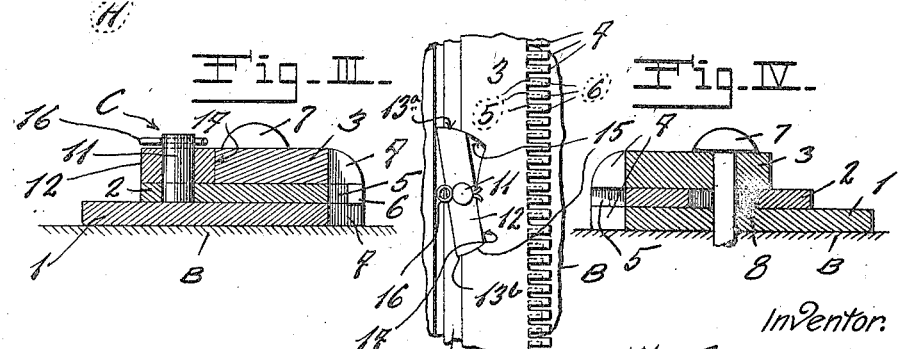
Inventor:
W. Cramer
by Cook & McCauley
His Attorneys

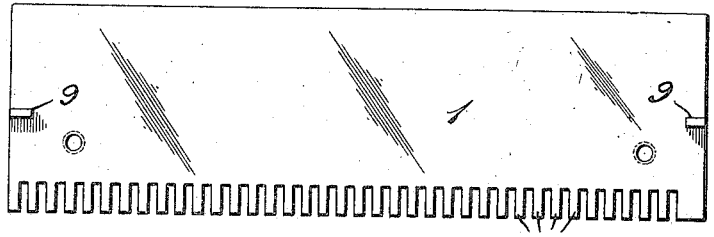
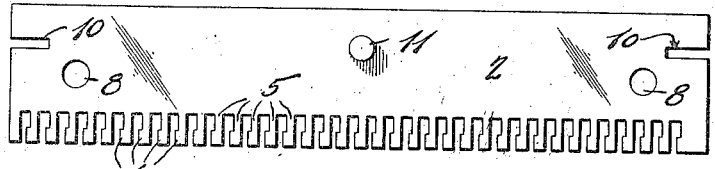
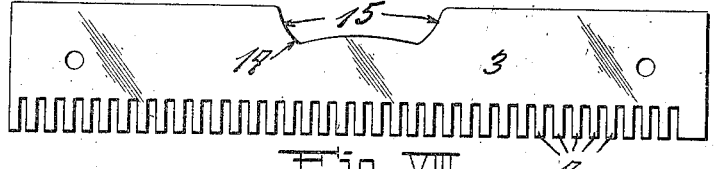
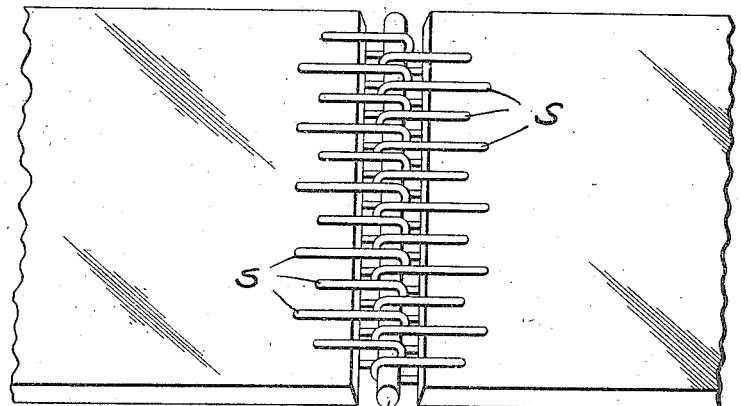

Patented Oct. 14, 1924.

1,511,710

UNITED STATES PATENT OFFICE.

WILLIAM CRAMER, OF ST. LOUIS, MISSOURI, ASSIGNOR TO TRUCK TRACTOR AND MANUFACTURING COMPANY, OF ST. LOUIS, MISSOURI, A CORPORATION OF MISSOURI.

BELT-FASTENING DEVICE.

Application filed September 11, 1922. Serial No. 587,484.

*To all whom it may concern:*

Be it known that I, WILLIAM CRAMER, a citizen of the United States of America, and a resident of the city of St. Louis and State of Missouri, have invented certain new and useful Improvements in Belt-Fastening Devices, of which the following is a full, clear, and exact description, reference being had to the accompanying drawings, forming a part of this specification.

This invention relates to improvements in belt fastening devices and particularly to a device for applying metallic belt lacings to power transmitting belts. The device disclosed herein is especially intended and adapted for use in connection with a well known and standard form of staples used for belt lacings and the invention relates particularly to the means for holding these staples while they are being secured to the ends of the belt.

The object of the invention is to produce a simple and inexpensive device which will be efficient in use and which is of such durable construction as to be able to withstand the rough usage to which devices of this kind are subjected.

With the foregoing and other objects in view, the invention comprises the novel construction, combination and arrangement of parts hereinafter more specifically described and illustrated in the accompanying drawings wherein is shown the preferred embodiment of the invention. However, it is to be understood that the invention comprehends changes, variations and modifications which come within the scope of the claims hereunto appended.

Fig. I is a plan view showing my improved belt fastening device in use, the belt being broken away to utilize space.

Fig. II is a longitudinal section on line II—II of Fig. I.

Fig. III is an enlarged section taken through the staple holding mechanism of my belt fastening device.

Fig. IV is an enlarged section on line IV—IV of Fig. I.

Fig. V is a detail plan view of the lowermost plate of the staple holding mechanism of my belt fastening device.

Fig. VI is a detail plan view of the movable plate of the staple holding mechanism of my belt fastening device.

Fig. VII is a detail plan view of the top plate of the staple holding mechanism of my belt fastening device.

Fig. VIII is a fragmentary longitudinal section through the ends of a belt, showing the lacing staples in place therein.

Fig. IX is a perspective view of a fragment of a belt showing the ends thereof laced together.

Fig. X is an enlarged fragmentary view of the staple holding mechanism of my belt fastening device showing the parts in position to receive the staples.

In the drawings, A designates my improved belt fastening device which comprises an anvil B, staple holding mechanism C and a hammer D. The anvil B is preferably formed of comparatively heavy metal and is provided with a plurality of reinforcing ribs B' which are intended to add durability to said anvil, and is also provided with a head portion E at its upper end.

Mounted on the anvil B immediately above the head portion E is the staple holding mechanism C, said mechanism comprising a base plate 1, an intermediate plate 2 and a top plate 3. The plates 1, 2 and 3 extend practically the full width of the anvil B and the plates 1 and 3 are provided with simple teeth 4 which are preferably formed by cutting a plurality of slots along one of the edges of each of said plates. The intermediate plate 2 is provided with teeth 5, each of said teeth being provided with a laterally projecting portion 6 at its outer end. The plates 1, 2 and 3 are secured to the anvil B by means of a pair of rivets 7 which pass through said plates and through the head portion of the anvil B. The openings in the plates 1 and 3 through which the rivets 7 pass are of the approximate diameter of said rivets whereby said plates 1 and 3 will be firmly fixed to said anvil, but the rivet openings 8 in the intermediate plate 2 are of much greater diameter than said rivets, hence said intermediate plate 2 is capable of moving relative to the plates 1 and 3. The plate 1 is provided with an upstanding lug 9 adjacent to each of its ends and the intermediate plate 2 is provided with a pair of slots 10 which are adapted to receive said lugs when the plates are assembled. The slots 10 are of greater length than the lugs 9 (Fig. I), hence because of the enlarged openings 8 and elongated slots 10 in the plate 2, said plate may be moved longitudinally of the plates 1 and 3.

Extending upwardly from the intermediate plate 2 is a pin 11 on which a short bar 12 is pivotally mounted, said bar being provided with eccentric faces 13 at its ends. The upper plate 3 is provided with a cutout portion 14 and the bar 12 is partially located within this cutout portion. The cutout portion 14 of the bar 3 is provided with cam faces 15 at its ends and these cam faces are engaged by the eccentric faces on the short bar 12. The short bar 12 is held in place on the pin 11 by means of a cotter pin 16.

The operation of the staple holding mechanism of my belt fastening device is as follows:

Assuming that it is desired to place a plurality of staples S in the staple holder C. The intermediate plate 2 is brought to the position in which it is shown in Fig. X of the drawing wherein the projections 6 on the teeth on said plate are drawn out of line with the slots in the plates 1 and 3. With the parts in the position described the staples may be inserted in the slots as shown in Fig. II. It is now desired to move the projections 6 into the slots so as to lock the staples in said slots and this may be accomplished by depressing one end of the bar 12 thus moving the eccentric face 13$^a$ on the bar 12 against the associated cam face 15 in the cutout portion 14. The top plate 3 is held stationary by the rivets 7 and as the distance from the center of the pin 11 to the outer corner of the face 13$^a$ is greater than the distance from the center of said pin to the inner corner of face 13$^a$, the effect of the movement of the face 13$^a$ against the face 15 will be to cam the intermediate plate 2 longitudinally of the plates 1 and 3, thus moving the projections in front of the curved portions of the staples S whereby said staples are locked in place within the slots. When it is desired to withdraw the staples from the slots, the eccentric face 13$^b$ is moved against the associated cam face 15 in the cutout portion 14 of the plate 3, whereby the plate 2 is moved in a direction to withdraw said projections 6 from said slots, thus releasing the staples S.

The hammer D of my improved belt fastening device comprises a head portion F and a pair of arms G, said hammer being pivoted to the head portion E of the anvil A by means of a pair of pins H.

J designates a knife which is pivoted to the anvil at the point indicated by the reference character K.

Before stapling the end of a piece of belting it is necessary to make a clean cut across said end so that it will fit truly into the tool and receive the staples in a straight line and this is accomplished by inserting the end of said belting under the pivoted knife J and driving said knife downwardly. The staples are placed in the staple holder C as already described and as shown in Fig. II, and the end of the belt is passed between the upper and lower points of the staples. The hammer D is then brought to the position shown by dotted lines in Fig. II, in which position said hammer is struck a hammer blow whereby the staples are driven into the belting as shown in Fig. XIII.

The belt ends are secured together by overlapping the staples S on the belt ends as shown in Fig. IX and then inserting a rod R through said overlapped staples.

I claim:

1. A belt fastening device comprising an anvil, and staple holding mechanism, said staple holding mechanism comprising a member provided with a plurality of slots adapted to receive a plurality of staples and a reciprocatory plate provided with projections adapted to lock said staples within said slots.

2. A belt fastening device comprising an anvil, staple holding mechanism, and movable staple clenching means, said staple holding mechanism comprising an upper stationary plate and a lower stationary plate provided with slots adapted to receive a plurality of staples and a reciprocatory plate intermediate of said upper and lower plates, said intermediate plate being provided with projections adapted to lock said staples within said slots.

3. A belt fastening device comprising an anvil, staple holding mechanism, and movable staple clenching means, said staple holding mechanism comprising a member provided with a plurality of slots adapted to receive a plurality of staples, reciprocatory means for holding said staples in place within said slots and pivoted means for operating said reciprocatory means.

4. A belt fastening device comprising an anvil, staple holding mechanism, and movable staple clenching means, said staple holding mechanism comprising a member provided with a plurality of slots adapted to receive a plurality of staples, reciprocatory means for holding said staples in place within said slots and means for operating said reciprocatory means comprising a pivoted member mounted on said reciprocatory means, said pivoted member being provided with a cam face adapted to contact with a stationary portion of said staple holding mechanism.

5. A belt fastening device comprising an anvil, staple holding mechanism, and movable staple clenching means, said staple holding mechanism comprising an upper stationary plate and a lower stationary plate provided with slots adapted to receive a plurality of staples, a reciprocating plate intermediate of said upper and lower plates, said intermediate plate being provided with projections adapted to lock said staples within said slots, and means whereby said reciprocating plate is operated comprising a pivoted member mounted on said reciprocating plate, said pivoted member being provided with cam faces adapted to contact with cam faces on one of said stationary plates.

In testimony that I claim the foregoing I hereunto affix my signature.

WILLIAM CRAMER.